United States Patent

[11] 3,586,923

| [72] | Inventors | Susumu Yoshimura<br>Kawasaki-shi;<br>Katsue Hasegawa, Tokyo, both of, Japan |
|---|---|---|
| [21] | Appl. No. | 790,664 |
| [22] | Filed | Jan. 13, 1969 |
| [45] | Patented | June 22, 1971 |
| [73] | Assignee | Matsushita Electric-Industrial Co., Ltd.<br>Osaka, Japan |
| [32] | Priority | Jan. 20, 1968, June 27, 1968, June 27, 1968, July 2, 1968 |
| [33] | | Japan |
| [31] | | 43/8402, 43/45257, 43/45258 and 43/46683 |

[54] ELECTROLYTIC CAPACITOR AND METHOD FOR MANUFACTURING SOLID ELECTROLYTE
4 Claims, 1 Drawing Fig.

[52] U.S. Cl.......... 317/230, 252/62.2, 29/570
[51] Int. Cl......... H01g 9/05

[50] Field of Search.......... 317/230, 231, 232, 233

[56] References Cited
UNITED STATES PATENTS
| 3,214,648 | 10/1965 | Ross et al. | 317/230 |
| 3,214,650 | 10/1965 | Ross et al. | 317/230 |

Primary Examiner—James D. Kallam
Attorney—Stevens, Davis, Miller & Mosher

ABSTRACT: A solid electrolytic capacitor with a charge transfer complex disposed in place of the usual electrolyte (paste or manganese dioxide), the acceptor being an organic substance having oxidizing property against aluminum, tantalum etc. and the donor being selected so as to decrease the resistivity of the complex compound as much as possible; the characteristic being that through the use of the organic semiconductor electrolyte the self-healing of oxide film is made possible.

PATENTED JUN22 1971 3,586,923
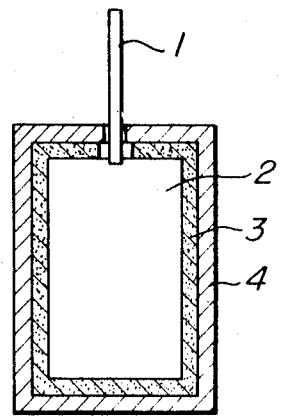
INVENTORS
SUSUMU YOSHIMURA
KATSUE HASEGAWA
BY Stevens, Davis, Miller & Mosher
ATTORNEYS

ELECTROLYTIC CAPACITOR AND METHOD FOR MANUFACTURING SOLID ELECTROLYTE This invention relates to a solid electrolytic capacitor having an improved electrolytic compound.

Generally, a dielectric film obtained by anodically oxidizing aluminum, tantalum, titanium, etc., is uniform and very thin, and has a relatively high dielectric constant so that it is used as the dielectric material of condensers. It is well known that in order to increase the operation voltage of the capacitor using such a dielectric film, the cathode should be made of an electrolytic solution. The properties that must be possessed by the electrolyte to act as a true cathode are that (1) it has a self-healing ability against partial destruction of the film and (2) the electric conductivity is high in order to suppress capacitor loss. The above-mentioned conditions can be well satisfied by manganese dioxide which is in practice used today as an electrolyte for a solid electrolytic capacitor. However, since manganese dioxide is precipitated on the dielectric film by thermal decomposition of manganese nitride, the electrode film inevitably suffers from damage due to the nitric acid and the temperature necessary for the thermal decomposition (about 300° C.). This results in a leakage current that cannot be reduced.

An object of this invention is therefore to provide a solid electrolytic capacitor using an electrolyte which need not be subjected to thermal decomposition and consequently causes no damage to the dielectric film. Namely, this invention uses as an electrolyte an organic substance of the charge transfer complex capable of film formation.

According to this invention which is free from thermal decomposition as required for manganese dioxide, the ratio of the forming voltage to working voltage can be greatly decreased.

Further, this invention attains simplification of steps and improvement of yields in manufacturing processes.

Other objects, features and advantages of the present invention will be readily apparent from the following detailed description of certain preferred embodiments taken in conjunction with the accompanying drawing, in which:

The drawing shows a sectional view of a solid electrolytic capacitor according to one embodiment of this invention.

Explanation of the embodiments will be made hereinafter. In the figure, 1 is an electrode lead, 2 is an aluminum or tantalum rod on the surface of which a thin oxide film of the above metal is formed, 3 is a solid electrolyte made of a charge transfer complex, and 4 is a conducting layer coated on the electrolyte 3 for taking out another lead.

The organic substance is usually an insulator having an electric resistivity of more than $10^{10} \Omega cm$. under the intrinsic condition. However, when a compound having a relatively large electron affinity (hereinafter referred to as acceptor) and another compound having a small ionization potential (hereinafter referred to as donor) are mixed by a suitable measure, the electric conductivity of the resulting solid becomes extremely high compared to those of the initial substances. This is due to an increase in the intermolecular force and in the electronic conductivity caused by the delocalization of electrons between the two chemical compounds. If the compounds are weakly coupled they form a "charge transfer chemical compound" while strongly coupled "a radical salt." Although the current through the highly conductive organic substance called a "donor-acceptor compound" is generally believed to be electronic, it is found to have an oxidizing ability against the above kinds of metal when the substance contains a suitable acceptor. The acceptor contemplated includes those generally known as strong oxidizing agents and if combined with the donor give rise to a semiconductor having a high electric conductivity while keeping its oxidizing property. Thus, the conditions for the electrolyte of the capacitor are completely satisfied.

EXAMPLE 1

The organic substance made of tetranitropyrene and dibenzophenothiazine (c. d.) of equal mol has a resistivity of about $100 \Omega cm$. When the organic substance is coated as an oxide film and a voltage of 30 v. is maintained, in 3 minutes the leakage current is decreased to about one-half to one-third of the initial value. Thus the capability of film formation is apparent.

EXAMPLE 2

The organic substance made of phenylboronic acid and tetrathiotetracene of equal mol has a resistivity of about $3000 \Omega cm$. When the organic substance is used as the electrolyte and a voltage of 30 v. is applied to the capacitor, the leakage current is decreased to about two-thirds of the initial value. Thus the capability of film formation is apparent.

EXAMPLE 3

Quinone system aromatic hydrocarbon is used the acceptor component. Aromatic amine such as diaminopyrene is most suitable for the donor. For example, a chemical compound of $p$-quinone and phenothiazine of equal mol shows an electric resistivity less than $10^3 \Omega cm$. When an anode voltage of 30 v. is applied to aluminum, the leakage current is decreased to about one-third of the initial value in 3 minutes. The quinone system hydrocarbons substituted by halogen, i.e. chloranil and bromoanil, can form with diaminopyrene and dibenzophenothiazine a compound with an extremely low resistivity (100 to 500 $\Omega cm$.) and good oxidizing property. However, they are not applicable to the aluminum electrolytic capacitor due to the existence of halogen ions, and mainly used for tantalum or titanium. (If the raw material is sufficiently refined, it may be used also for aluminum.)

The invention disclosed hereinbelow can further decrease the electric resistivity of the above electrolyte and constitutes a solid electrolytic capacitor with a low loss. The characteristic of this invention is that the compounds which in spite of the oxidizing property are unsuitable for electrolyte because of the high resistivity can be made applicable by decreasing the value. Namely this invention aims to increase the electric conductivity of the compounds by adding a small amount of graphite to the above organic donor-acceptor complexes.

Although the acceptor and donor components may be any of the above-mentioned compounds, here particularly picric acid and phenothiazine having a high resistivity are used for illustration. The crystal obtained either by precipitating the compounds from liquid phase in ethylalcohol or by heating and mixing them in vacuum shows a resistivity of $10^7 \Omega cm$. When this crystal is mixed with graphite or carbon black powder, the resistivity of the compound is remarkably decreased. For example, the addition of 10 percent by weight of graphite powder reduces the resistivity from the above value to $10^3 \Omega cm$.

The reason is considered to be as follows. Since graphite (C) has a medium electron affinity force and ionizing potential, it acts as a donor against the acceptor (picric acid here) while as an acceptor against the donor (phenothiazine here). As a result, the delocalization of electrons in the crystal is intensified. It is possible to control arbitrarily the resistivity of the compounds over a range of about three orders by varying the adding amount of graphite powder. However, when the amount of graphite is excessively increased, the oxidizing property is lowered. Therefore, the amount of addition should be at most less than 50 percent.

The gist of the embodiment is that the electric resistivity of organic donor-acceptor having the oxidizing property and composed by suitable acceptor is varied by the addition of graphite powder. Although the breakdown voltage of electrolytic capacitor depends on the resistivity of electrolyte, in this embodiment it can be controlled by the amount of graphite addition.

Hereinafter, a method for preparing suitable compound for the electrolyte will be explained with reference to one embodiment.

1. The donor and acceptor to be used are dissolved in suitable solvent. For example, in the combination of picric acid and phenothiazine the solvent is ethylalcohol (room temperature), while in the combination of picric acid and dibenzophenothiazine the solvent is benzene at 50° to 70° C.

2. When the solution is left for a whole day and night, donor-acceptor compound is precipitated on the bottom of the vessel. In this case acceptor and donor are coupled by equal mol. The precipitation is filtered and dried.

3. The compound thus obtained is mixed further with a prescribed amount of acceptor (in this example picric acid) and ground in a motor. Since the addition of acceptor is done in the neutral state, the acceptor molecule increases the oxidizing property of the compound. This added acceptor, also, plays the same role as that in an inorganic semiconductor and converts the donor-acceptor compound into a P-type semiconductor. The electric conductivity of the electrolyte becomes maximum for a given excess acceptor concentration, the value being increased by one or two orders compared to that without addition. In this way characteristic of the electrolyte for a capacitor becomes freely variable.

In the above embodiment the preparation of the donor-acceptor compound does not start with the mixing of a predetermined ratio thereof, but by making preliminarily a perfect compound with known ingredients by using a solvent. Acceptor is added to the solvent thereby to control the oxidizing property, electric conductivity and P-type semiconductor tendency.

Therefore, not only a good conductivity is obtainable but the characteristics can be simply controlled.

We claim:

1. In a solid electrolytic capacitor having an anode of film forming metal, a dielectric oxide film on the anode, a solid electrolyte and a cathode; the improvement comprising said electrolyte including a charge transfer complex compound comprising an organic compound including an acceptor material selected from the group consisting of an aromatic nitro compound, an aromatic boric acid and a quinone system aromatic hydrocarbon, and a donor material which is an aromatic amine.

2. The solid electrolytic capacitor of claim 1, wherein said acceptor material is an aromatic nitro compound.

3. The solid electrolytic capacitor of claim 1, wherein said acceptor material is an aromatic boric acid.

4. The solid electrolytic capacitor of claim 1, wherein said acceptor material is a quinone system aromatic hydrocarbon.

UNITED STATES PATENT OFFICE
CERTIFICATE OF CORRECTION

Patent No. 3,586,923　　　　　　　　Dated　　June 22, 1971

Inventor(s)　Susumu YOSHIMURA et al

It is certified that error appears in the above-identified patent and that said Letters Patent are hereby corrected as shown below:

The first Japanese application number should read

--43/3402-- and not "43/8402".

Signed and sealed this 11th day of January 1972.

(SEAL)
Attest:

EDWARD M. FLETCHER, JR.　　　　　ROBERT GOTTSCHALK
Attesting Officer　　　　　　　　Acting Commissioner of Patents